(12) United States Patent
Steinborn et al.

(10) Patent No.: US 7,337,052 B2
(45) Date of Patent: Feb. 26, 2008

(54) METHOD FOR AUTOMATICALLY CONTROLLING A TRANSMISSION BRAKE OF AN AUTOMATIC TRANSMISSION CONFIGURED AS A COUNTERSHAFT TRANSMISSION

(75) Inventors: Mario Steinborn, Friedrichshafen (DE); Rudolf Kalthoff, Weingarten (DE); Volker Bachmann, Eriskirch (DE); Rupert Kramer, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 76 days.

(21) Appl. No.: 10/544,957

(22) PCT Filed: Jan. 31, 2004

(86) PCT No.: PCT/EP2004/000863

§ 371 (c)(1),
(2), (4) Date: Aug. 8, 2005

(87) PCT Pub. No.: WO2004/070232

PCT Pub. Date: Aug. 19, 2004

(65) Prior Publication Data

US 2006/0142919 A1  Jun. 29, 2006

(30) Foreign Application Priority Data

Feb. 8, 2003 (DE) .................................. 103 05 254

(51) Int. Cl.
*F16H 61/00* (2006.01)
*F16H 48/24* (2006.01)

(52) U.S. Cl. ........................................ 701/66; 477/120

(58) Field of Classification Search .................. 701/66
See application file for complete search history.

(56) References Cited

U.S. PATENT DOCUMENTS

| | | | |
|---|---|---|---|
| 3,834,499 A | | 9/1974 | Candellero et al. |
| 4,081,065 A | * | 3/1978 | Smyth et al. ................ 477/176 |
| 5,425,689 A | * | 6/1995 | Genise ........................ 477/120 |
| 5,822,708 A | | 10/1998 | Wagner et al. |
| 6,445,991 B1 | * | 9/2002 | Dobele et al. ................ 701/67 |
| 6,625,536 B1 | * | 9/2003 | Vohmann et al. ............. 701/67 |
| 6,785,598 B2 | | 8/2004 | Schiele |
| 2001/0049574 A1 | * | 12/2001 | Taniguchi et al. ............ 701/51 |

FOREIGN PATENT DOCUMENTS

| | | |
|---|---|---|
| DE | 195 44 516 A1 | 6/1997 |
| DE | 196 52 916 A1 | 6/1998 |
| DE | 100 23 053 A1 | 12/2001 |
| EP | 0 947 741 A2 | 10/1999 |

* cited by examiner

*Primary Examiner*—Jack Keith
*Assistant Examiner*—Jonathan Goldfarb
(74) *Attorney, Agent, or Firm*—Davis Bujold & Daniels, P.L.L.C.

(57) ABSTRACT

A method for controlling and regulating a transmission brake of an automatic transmission designed as a gear reduction unit in which the rotation speed of a countershaft of the gearbox can be decelerated in an upshift such that it corresponds to the synchronized rotation speed or comes close to it up to a predetermined distance during an upshift operation. The brake gradient of the countershaft rotation speed or the gear input rotation speed as well as the gear output shaft rotation speed is taken into consideration for the control and regulation of the gearbox brake. The gradient of the gear output shaft rotation speed is analyzed to control and regulate operation of the bearbox brake to improve the upshift, operations.

10 Claims, 1 Drawing Sheet

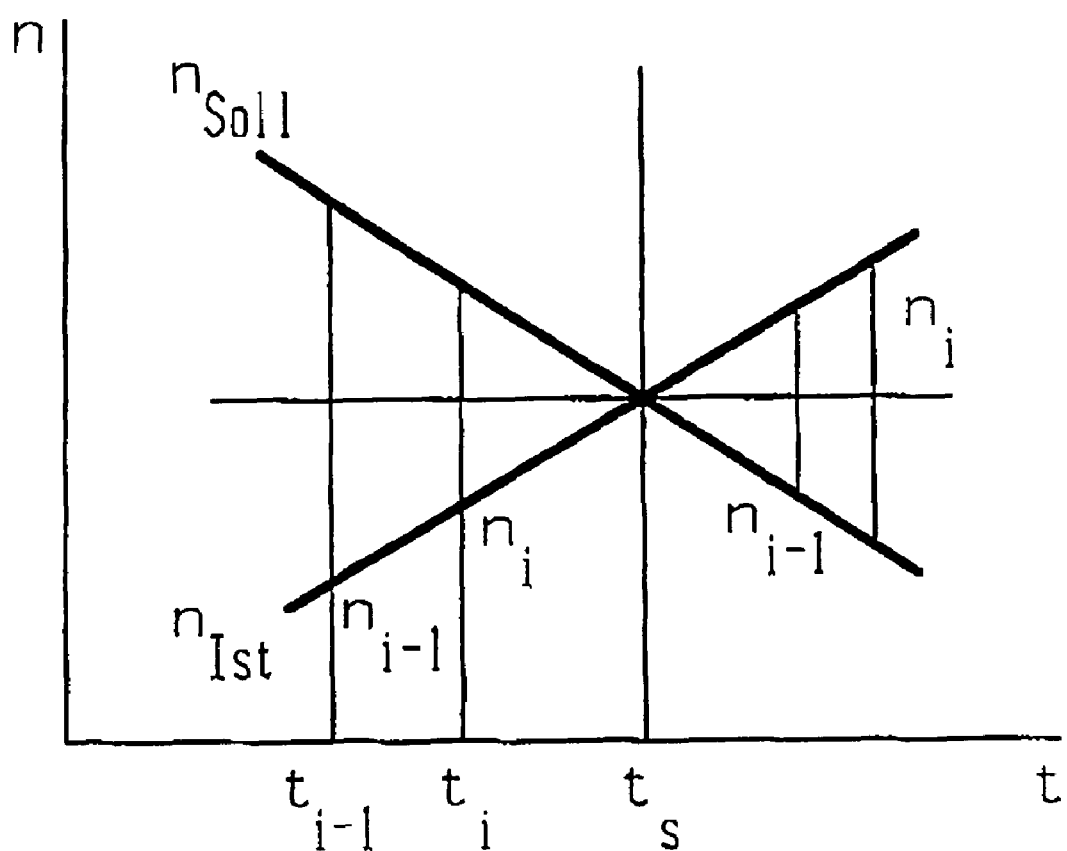

METHOD FOR AUTOMATICALLY CONTROLLING A TRANSMISSION BRAKE OF AN AUTOMATIC TRANSMISSION CONFIGURED AS A COUNTERSHAFT TRANSMISSION

This application is a national stage completion of PCT/EP2004/000863 filed Jan. 31, 2004 which claims priority from German Application Serial No. DE 103 05 254.2 filed Feb. 8, 2003.

FIELD OF THE INVENTION

The invention relates to a method for controlling and regulating the operation of a gearbox brake of an automatic transmission designed as a gear reduction unit.

BACKGROUND OF THE INVENTION

It is generally known that manual and automatic transmissions usually comprise an input shaft, an output shaft that is coaxial to the input shaft and a countershaft. Depending on the number of gears, there is a corresponding number of gear wheels on the gear shafts, on which there is a stationary wheel mounted on a gear shaft combs with at least one loose wheel arranged on a further gear shaft.

With a forward shift generally one of the loose wheels will be non-rotatably connected to the gear shaft via a positively acting clutch arrangement, which transmits the total drive torque. In order to transmit large torque with simple, space-saving and easily switched means, one preferably uses positive clutches. During the forward gearshift the tractive power of the driving engine will, however, be interrupted by way of a special switching and starting clutch.

In order to shift such transmissions easily, lightly, jerk-free, quickly and with low noise, the switching parts of the clutch arrangement must have about the same number of revolutions before these mesh with one another. For this purpose, synchronizing parts are provided, which delay or accelerate the drive-side part of the drive train between the shifting and starting clutch and clutch arrangement that is supposed to be shifted during a tractive power interruption phase to a speed that is set depending on the driving speed and the gear ratio of the target gear. If one switches from a lower gear to a higher gear then with the help of the synchronization arrangement the drive-side part of the gearbox will be delayed, whereas it will be accelerated in a reverse gear motion.

The ordinary synchronization arrangements have for these delayed and accelerated actions, friction clutches in the form of friction cones. These do not have to transmit the entire torque, but only perform the synchronization work, which is a result of the moments of inertia of the rotating masses of the drive-side part of the transmission as well as the friction-related drag torque. Therefore they can accordingly be made of a small dimension.

Typically each of the positive clutch arrangements is provided with a synchronization arrangement. It is, however, also possible that a central synchronization arrangement assumes the synchronizing work for several or all positive clutch arrangements.

In order to relieve the driver of a vehicle from the mechanical shift and clutch processes associated with shifting operations, these automated shifting processes are performed by auxiliary force-aided adjusting controls in automated gearboxes, which are selected by a controlling and regulation arrangement.

In addition, such a controlling and regulation arrangement uses vehicle sensor data to detect the driver's preferences and controls and regulates the switching activity of the gearbox on their basis by way of memorized controlling and regulation programs.

In such automatic gearboxes, the synchronization process can, for example, be controlled and regulated so that during reverse control operations the number of rotations of the gear input shaft or the countershaft will be raised due to the increase in the engine speed whereas during up-shifts these drive-side shafts of the gearbox will be decelerated. In order to carry out such brake activities, there are centrally synchronized gearboxes, which usually are coupled via a gearbox brake that is connected to the counter shaft. Such gearbox brakes can be operated electrically, hydraulically or pneumatically, whereby the latter operating mechanism is more often used for commercial vehicle gearboxes.

In DE 196 52 916 A1 an automatic transmission with a hydraulically or pneumatically operated gearbox brake is known wherein on the latter a countershaft can act. The pressure fluid control valves of the gearbox brake are controlled by a microprocessor dependent on the desired type of switch and the other driving conditions.

If a higher gear is, for example, chosen and the countershaft must be decelerated for synchronization, the microprocessor will calculate a target revolution speed (synchronized revolution speed) for the countershaft based on the chosen gear transmission ratio and by way of a sensor, wherein mechanic coupling of the target gear loose wheel can occur when said target speed has been reached.

Due to the usually difficult to regulate air pressure as well as other varying surrounding conditions, the brake power of the gearbox brake is subjected to large fluctuations. In order to achieve the necessary rotation speed, that is the maximum distance of the actual rotation speed of the gear input shaft or that of a countershaft driven by it to the target rotation speed for the concrete switch activity, according to the state of the art, the braking gradient is determined and taken into consideration by the microprocessor during the control of the gearbox brake. For this to happen, the microprocessor regulates the control valves in such a way that the known preset given values and thus the synchronized rotation speed for engagement of the clutch arrangement on the respective loose wheel can be reached.

Unfortunately, the synchronous rotation speed is not a set speed for a switch activity and is among other things dependent on the grade of the road. The reason for this is that a switch activity with an open starting and switching clutch as well as a grade can lead to a negative vehicle acceleration and thus to a decline in the gear output speed and for a gradient when the gearbox brake is not being operated it could lead to a positive vehicle acceleration. These influences have not been accounted for previously in the state of the art for the control and regulation methods for gearbox brakes, which means that before their means of operation was not complete.

The task of the invention is therefore to continue to improve the control and regulation of the gearbox brake.

The solution to this task is found in the features of the main claim, while the inventive advantages of further development and design are found in the subordinate claims.

SUMMARY OF THE INVENTION

The invention concerns the control and regulation of the gearbox brake of an automatic transmission designed as a gear reduction unit, which consists of a gear input shaft, at least one countershaft driven by the gear input shaft and a gear output gear shaft. The gear input gear shaft is connected to a drive shaft of a drive motor via a starting and shifting clutch, while the gear output gear shaft is connected via at least one differential gearbox to drive shafts connected to the vehicle wheels. On the gear input shaft, on countershaft or countershafts and/or on the gear output shaft, cog wheels are arranged non-rotatably, which mesh with each other at least in pairs. In addition such a gearbox has positive clutch arrangements that aid the loose wheels in being non-rotatably connected to the gear shaft alternatively to each other when carrying out a gearshift.

In addition such a gearbox is equipped with a gearbox brake as well as a control apparatus to at least technically connect the gearbox brake with a signal. With the aid of the gearbox brake at least one of the countershafts can be decelerated in an upshift process such that its rotational speed corresponds to or is within a predetermined difference from the synchronized engine speed at the predetermined engagement time. In order to do so, the control and regulation of the transmission brake and the resulting gradients of the rotation speeds of the gear reduction unit, the gear input shaft and the gear output shaft rotation speed will be considered.

In order to improve a transmission upshift process, the invention has provided that, in addition to considering the above-mentioned variables for the control and regulation of the transmission brake, the gradient of the gear output shaft rotation speed is also analyzed according to the method described herein below. By using this method, the gear output shaft speed will be better linked to the speed of the countershaft, the gear ratio of for the target speed of the upshift process and environmental and/or road conditions. In particular, quick changes in the gear output shaft speed during the shifting operation can be taken into consideration for the control and regulation of the transmission brake.

In a preferable arrangement of the invention, it is foreseen that the gradient of the gear input shaft speed or the countershaft speed and the gradient of the gear output shaft speed reach a total gradient. This total gradient can then be used to calculate the shutdown time of the transmission brake when reaching the synchronization time. The shutdown time can, therefore, also be determined for variable transmission brake friction values and changing output rotation speed gradients to secure a safe and fast shifting operation without jerks.

BRIEF DESCRIPTION OF THE DRAWING

The invention will now be described, by way of example, with reference to the accompanying drawings in which:

The only FIGURE shows an engine speed gradients of the target speed ($n_{Soll}$) and the actual speed ($n_{Ist}$) of the gear input shaft or the countershaft during a down-shift operation before and after reaching the synchronized time ($t_S$).

DETAILED DESCRIPTION OF THE INVENTION

The connections of the control and regulation method, according to the invention, to mathematics and physics, as well as the equations based on this are derived from the drawing and explained in the following. In this drawing, the engine speed gradients of the target speed ($n_{Soll}$) and the actual speed ($n_{Ist}$) of the gear input shaft or the countershaft during a downshift operation before and after reaching the synchronized time ($t_S$) are depicted. Here the synchronized time is defined as the time in which the target and actual gradients of the gear input shaft or countershaft speed intersection one another. As the gear input shaft usually drives the countershaft of the transmission, via a stationary wheel toothing, the rotation speeds of the gear input shaft and countershaft are proportional to one another so that it makes no difference whether the gear input shaft rotation speed or the countershaft rotation speed is used for controlling and regulating the transmission brake.

Although the inventive method concerns the deceleration of the transmission shaft during an upshift operation, the fundamental connections during a transmission shifting operation can also be understood from this diagram.

For the rotation speed difference $\Delta n_i$ between the target rotation speed $n_{Soll}$ and the actual rotation speed $n_{Ist}$ of the gear input shaft or countershaft at the time $t_i$ the following applies:

$$\Delta n_i = n_{Soll} - n_{Ist} \tag{G1.1}$$

as well as for the above-mentioned rotation speed gradients with $t_p$ representing the predetermined scanning or program cycle time.

$$\dot{n} = \frac{\Delta n_i - \Delta n_{i-1}}{t_p} \tag{G1.2}$$

The rotation speed difference $\Delta n$ between the target rotation speed $n_{Soll}$ and the actual rotation speed $n_{Ist}$ of the gear input shaft or countershaft accordingly during the time frame I before the synchronization time $I_s$ for a down-shift is $\Delta n_i > 0$, while for an up-shift it is $n_{Soll} < n_{Ist} \Rightarrow \Delta n_i < 0$.

According to the following equation, the value for the rotation speed total gradient $\Delta \dot{n}$ during a down-shift is:

$$|\Delta n_i| < |\Delta n_{i-1}| \Rightarrow \dot{n} < 0 \tag{G1.3}$$

and during an upshift it is:

$$|-\Delta n_i| < |-\Delta n_{i-1}| \Rightarrow \dot{n} > 0 \tag{G1.4}$$

For the rotation speed ratios during the time II after the synchronized time frame $I_s$ the following equations apply:

$$\Delta n_i < 0 \ (n_{Soll} < n_{Ist}) \tag{G1.5}$$

in the case of a downshift and $$\Delta n_i > 0 \tag{G1.6}$$

for an upshift.

Therefore the rotation speed total gradient $\Delta \dot{n}$ has the following value when there is a downshift operation in the time II after the synchronized time $I_s$:

$$|-\Delta n_i| < |-\Delta n_{i-1}| \Rightarrow \dot{n} < 0 \tag{G1.7}$$

and in the case of an upshift $$|\Delta n_i| < |\Delta n_{i-1}| \Rightarrow \dot{n} > 0 \tag{G1.8}$$

The synchronization time $I_s$ can be calculated from the quotient of the rotation speed difference $\Delta n_i$ between the target rotation speed $n_{Soll}$ and the actual rotation speed $n_{Ist}$ of the gear input shaft or countershaft and the rotation speed gradient ṅ so that the following equation applies for the synchronization time:

$$t_s = \frac{\Delta n}{\dot{n}} \quad (GI.9)$$

A change to temporally discrete steps results in the following rotation total gradient for the programming of the control and regulation apparatus for the rotation speed gradient ṅ:

$$\frac{\Delta n_i}{\Delta n_{i-1}} = \frac{t_{Si}}{t_{Si-1}} \Rightarrow \dot{n} = \frac{\Delta n_i}{t_{Si}} = \frac{\Delta n_{i-1}}{t_{Si-1}} \quad (GI.10)$$

in which $t_{Si}$ is the time frame from the time $t_i$ until the synchronization time $t_S$.

By changing the equation (GI.10) by using equation (GI.2) one arrives at the following equation:

$$t_p = t_{Si} - t_{Si-1} = \frac{\Delta n_i}{\dot{n}} - \frac{\Delta n_{i-1}}{\dot{n}} = \frac{\Delta n_i - \Delta n_{i-1}}{\dot{n}} \quad (GI.11)$$

that can be modified into the equation for the rotation speed total gradient ṅ

$$\dot{n} = \frac{\Delta n_i - \Delta n_{i-1}}{t_p} \quad (GI.12)$$

Here with concrete programming a program cycle time $t_p$ of preferably 10 ms can be planned. In such a case the rotation speed total gradient ṅ is at $t_p$=10 ms, which is equal to a value of $t_p$=1, on with an overlapping calculation at $t_p$=20 ms leads to a value $t_p$=2.

In addition, the time frame $t_{Si}$ from the time $t_i$ until the synchronization time $t_S$ is found on the basis of the following equation $$t_{Si} = \frac{\Delta n_i}{\dot{n}} = k * t_p \quad (GI.13)$$

in which k is the number of program cycles until the synchronization time $t_S$ is reached.

The concrete steps of completing such a control program sequence preferably follow the following sequence of events:

a. Establishing the rotation speed difference $\Delta n_i$, between the target and actual rotation speeds at time $t_i$:

$$\Delta n_i = (n_{Soll} - n_{Ist}) \quad (GI.14)$$

b. Overlapping calculation of the rotation speed gradient with a program cycle time $t_p$=20 ms:

$$\dot{n} = \frac{\Delta n_i - n_{i-2}}{2} \quad (GI.15)$$

c. Intermediate storage of the rotation speed differences for the next calculation:

$$\Delta n_i 2 = \Delta n_i - 1 \quad (GI.16)$$

$$\Delta n_i - 1 = \Delta n_i \quad (GI.17)$$

d. Calculation of the time $t_{St}$ until the synchronization time $t_S$ as well as the necessary program cycles have been reached:

$$t_{Si} = \frac{\Delta n_i}{\dot{n}} \rightarrow k * t_p \quad (GI.18)$$

and e. actuation of the transmission brake until reaching the synchronization time $t_S$ or a predetermined distance to this synchronization time $t_S$.

REFERENCE NUMERALS n rotation speed
$n_{Soll}$ target rotation speed of the countershaft or the gear input shaft during shifts
$n_{Ist}$ actual rotation speed of the countershaft or the gear input shaft during shifts
$n_i$ the rotation speed at the time $t_i$
$\Delta n_i$ the rotational speed difference between the target and the actual rotation speed at time $t_i$
t time
$t_i$ time frame
$t_p$ program cycle time
$t_S$ time at which the target and actual rotation speed courses intersect one another (synchronization time)
$t_{Si}$ time between time $t_i$ and synchronization point $t_S$
ṅ rotational speed total gradient

The invention claimed is:

1. A method for controlling and regulating a transmission brake of an automatic gearbox designed as a gear reduction unit to perform a gearshift the gearbox including a gear input shaft, at least one countershaft that can be driven by the gear input shaft and a gear output shaft, and having loose cog wheels seated on at least one of the gear input shaft, the countershaft and the gear output shaft, and having at least one of loose rotational cog wheels and stationary cogwheels seated non-rotatably on at least one of the gear input shaft, the countershaft and the gear output shaft, at least one pair of cogwheels being in tooth engagement, and the loose cogwheels non-rotatably connected to at least one of the gear input shaft, the countershaft and the gear output shaft by a clutch to perform a gearshift, the method comprising the steps of:
  determining for a time frame $t_i$.
    a gradient of a rotational speed difference $\Delta n_i$ between an actual rotational speed $n_{Ist}$ and a target rotational speed $n_{Soll}$ of one of the gear input shaft and the countershaft, and
    a gradient of the gear output shaft rotational speed,
  determining over at least one program time cycle $t_p$ a total rotational speed gradient ṅ as a gradient of a summation of the gradient of the rotational speed difference $\Delta n_i$ between the actual and the target rotational speeds of the one of the gear input shaft and the countershaft and the gradient of the output shaft rotational speed, determining from the total rotational speed gradient ṅ a synchronization time $t_S$ at which the target and the actual rotational speeds of the gear input shaft and the countershaft will be within a predetemined difference, and during an upshift process, controlling a countershaft brake so that the target and the actual rotational speeds of the gear input shaft and the countershaft are within the predetermined difference at a predetermined engagement time.

2. The method according to claim 1, wherein the total rotational speed gradient ṅ is calculated based on the equation $$\dot{n} = \frac{\Delta n_i - \Delta n_{i-1}}{t_p} \quad (G1.19)$$

in which $t_p$ represents a program cycle time and the rotational speed difference $\Delta n_i$ between the target and the actual rotational speeds of one of the countershaft and the gear input shaft rotational speeds at time frame $t_i$ which $\Delta n_{i-1}$ is a first immediately preceding value of $\Delta n_i$.

3. The method according to claim 1, wherein a shutdown time for the transmission brake is determined from the rotational speed total gradient ṅ required to reach a synchronized rotational speed.

4. The method according to claim 3, wherein the shutdown time $t_{Si}$, until reaching the synchronized rotational speed, is calculated as:

$$t_{Si} = \frac{\Delta n_i}{\dot{n}} = k * t_p \quad (G1.20)$$

in which k depicts a number of program cycles.

5. The method according to at claim 1, wherein a program for a control and regulation apparatus that triggers the transmission brake comprises the steps:

determining the rotational speed difference $\Delta n_i$ between the target and the actual rotational speed at the time frame $t_i$ as:

$$\Delta n_i = (n_{Soll} - n_{Ist}) \quad (G1.21)$$

determining the rotational speed gradient ṅ as:

$$\dot{n} = \frac{\Delta n_i - n_{i-2}}{2} \quad (G1.22)$$

in which $\Delta n_{1-2}$ is a second orecedina value of $\Delta n_i$, storing the rotational speed difference $\Delta n_i$ for at least:

$$\Delta n_i{-}2 = \Delta n_{i-1} \text{ and} \quad (G1.23)$$

$$\Delta n_{i-1} = \Delta n_i \quad (G1.24)$$

in which $\Delta n_{i-1}$ is a first preceding value of $\Delta n_i$, determining a timing $t_{Si}$ until reaching the synchronization $t_S$ rotational speed as:

$$t_{Si} = \frac{\Delta n_i}{\dot{n}} \rightarrow k * t_p \quad (G1.25)$$

and controlling the countershaft brake so that the target and actual rotational speeds of the gear input shaft and the countershaft are within the predetermined difference at the predetermined engagement time.

6. A method for controlling and regulating a transmission brake of an automatic gearbox having a gear input shaft, a gear output shaft and at least one countershaft that can be driven by the gear input shaft, the method comprising the steps of seating cog wheels on one or more of the countershaft, the gear output shaft and the gear input shaft, the cog wheels are at least one of loose rotational cog wheels and stationary cogwheels seated non-rotatably on at least one of the gear input shaft, the countershalt and the gear output shaft and at least one pair of cogwheels are in tooth engagement, non-rotatably connecting the loose wheels to the gear shaft by a clutch in order to perform a gearshift, determining in a time frame $t_i$.

a gradient of a rotational speed difference $\Delta n_i$ between an actual rotational speed $n_{Ist}$ and a target rotational speed $n_{Soll}$ of one of the gear input shaft and the countershaft and a gradient of the gear output shaft rotation speed, determining over at least one program time cycle $t_p$ a total rotational speed gradient ṅ as a gradient of a summation of the gradient of the rotational speed difference $\Delta n_i$ between the actual and target rotational speeds of the one of the gear input shaft and the countershaft and the gradient of the output shaft rotation speed, determining from the total rotational speed gradient ṅ a synchronization time $t_S$ at which the target and actual rotational speeds of the gear input shaft and the countershaft will be within a predetermined difference, and during an upshift process, controlling a countershaft brake so that the target and actual rotational speeds of the gear input shaft and the countershaft are within a predetermined difference at a predetermined engagement time.

7. The method according to claim 6, further comprising the step of determining the total rotational speed gradient ṅ as:

$$\dot{n} = \frac{\Delta n_i - \Delta n_{i-1}}{t_p} \quad (G1.19)$$

in which $\Delta n_{i-1}$ is a first preceding value of $\Delta n_i$.

8. The method according to claim 6, further comprising the step of determining a shutdown time for the transmission brake from the total rotational speed gradient ṅ in order to reach a synchronized rotational speed.

9. The method according to claim 8, further comprising the step of calculating the shutdown time $t_{Si}$ until reaching the synchronized rotational speed as:

$$t_{Si} = \frac{\Delta n_i}{\dot{n}} = k * t_p \quad (G1.20)$$

in which k is a number of program cycles.

10. The method according to claim 6, further comprising a method triggering the transmission brake with a program for a control and regulation apparatus comprises the steps of:

determining the rotation speed difference $\Delta n_i$ between the target and actual rotation speed at the time frame $t_i$ as $$\Delta n_i = (n_{Soll} - n_{Ist}) \quad (G1.21)$$

determining the total rotational speed gradient $\dot{n}$ as:

$$\dot{n} = \frac{\Delta n_i - n_{i-2}}{2} \quad (G1.22)$$

in which $\Delta n_{i-2}$ is a second preceding value of $\Delta n_i$.

storing the rotational speed difference $\Delta n_i$ for at least:

$$\Delta n_{i-2} = \Delta n_{i-1} \text{ and} \quad (G1.23)$$

$$\Delta n_{i-1} = \Delta n_I \quad (G1.24)$$

in which $\Delta n_{i-1}$ is a first preceding value of $\Delta n_I$, determining a time $t_{Si}$ until reaching the synchronized rotational speed as $$t_{Si} = \frac{\Delta n_i}{\dot{n}} \rightarrow k * t_p \quad (G1.25)$$

and controlling a countershaft brake so that the target and the actual rotational speeds of the gear input shaft end the countershaft are within a predetermined difference at a predetermined engagement time.

* * * * *